J. E. THORNTON.
FILM FOR MOTION PICTURES AND METHOD OF MAKING THE SAME.
APPLICATION FILED JULY 3, 1915.

Patented Jan. 16, 1917.

Witnesses:
M. E. McNade.

INVENTOR.
John E. Thornton
by
Attorney

UNITED STATES PATENT OFFICE.

JOHN EDWARD THORNTON, OF WEST HAMPSTEAD, LONDON, ENGLAND, ASSIGNOR TO JOHN OWDEN O'BRIEN, OF MANCHESTER, ENGLAND.

FILM FOR MOTION-PICTURES AND METHOD OF MAKING THE SAME.

1,213,038.     Specification of Letters Patent.     Patented Jan. 16, 1917.

Original application filed November 26, 1912, Serial No. 733.633. Divided and this application filed July 3, 1915. Serial No. 38,016.

*To all whom it may concern:*

Be it known that I, JOHN EDWARD THORNTON, a British subject, residing at West Hampstead, London, England, have invented certain new and useful Improvements in Films for Motion-Pictures and Methods of Making the Same, of which the following is a specification.

This invention relates to the production of film for colored cinematograph or motion pictures, and is designed to provide a film in the form of a single strip, in which the successive pictures follow each other in direct sequence and from which the pictures will be projected in the colors of nature without the use of color screens.

It has been proposed in producing a colored picture to print or obtain all the colors from a single ordinary original negative on a color sensitive plate by screening with a light filter the negative or positive during printing.

This invention consists in constructing a film of complete color pictures from two or more section picture negatives by first printing a film from one section picture negative, and then after being developed, colored and dried, re-coating and re-sensitizing the film and printing thereon from another section picture negative, and so on to produce the complete color picture film. Such a film will possess the following advantages over other motion picture color film systems in which two or more films are employed:—

(1) The film is a single strip of standard width and will therefore fit the regular projecting apparatus used for monochrome films.

(2.) The pictures follow in direct sequence, instead of in alternate sequence as in another well-known system. Therefore it only uses half the amount of film that the former process uses, and can be projected at the same speed as monochrome film, instead of requiring double speed, as that does.

(3.) It requires no color filters, before the projection lenses or the film, therefore requires no special projecting apparatus, and passes more light through because there are no screens.

(4.) It is also more transparent because the image itself is a colored one, instead of the usual black silver image plus color filters.

The invention will be fully described with reference to the accompanying drawings:—

Figure 1:
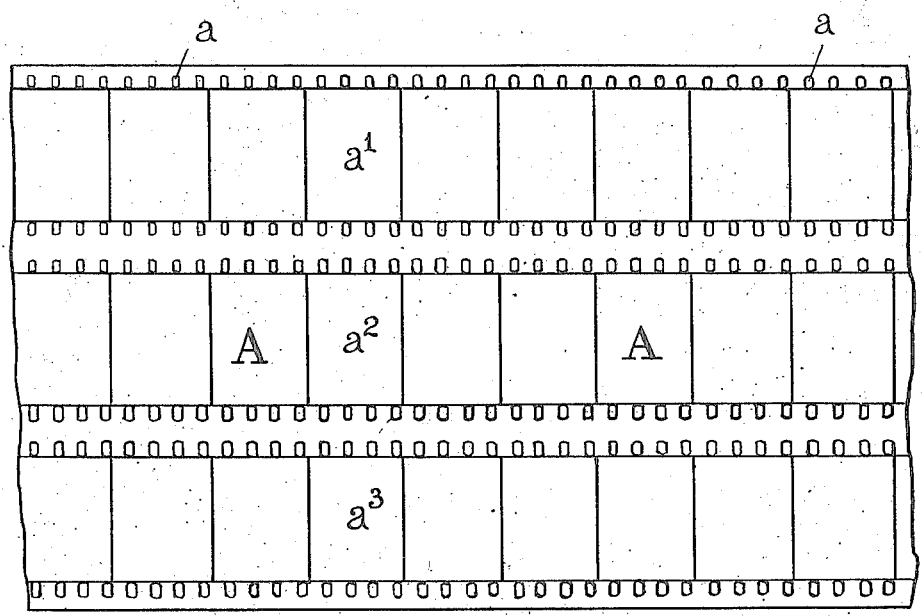
Figure 2:
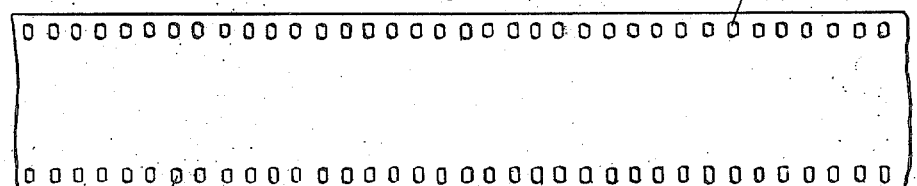
Figure 3:
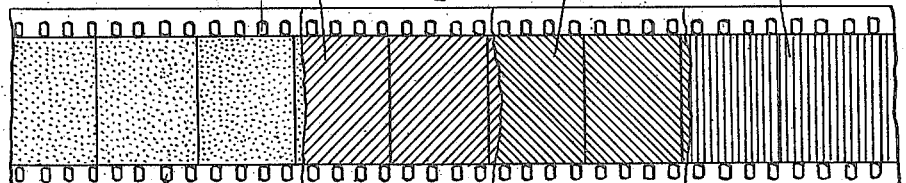

Figure 1 shows an original negative of triple width having three color section pictures side by side representing red, green and violet. Fig. 2 shows a single sensitized celluloid film before being printed from any of the sections of the negative. Fig. 3 shows a complete color picture film having been sensitized and developed three times after having been printed from each of the three sections of the negative.

An original negative is taken or prepared on a film of double or triple width, by a camera having two or three lenses side by side, fitted with suitable means for adjusting their optical axis to project the separate section pictures side by side on to the film, each lens being provided with a different color screen. Such a negative however is not new, and positives have been obtained therefrom of the same width from which the pictures have been projected therefrom by double or treble lenses and superimposed upon the screen to give the complete pictures, color screens being employed to give the desired colors to the pictures. Or a negative is taken on a single strip of film with the color section pictures in alternate sequence. Such a negative is not new and positives have been obtained therefrom from which the pictures have been projected in rapid succession.

The improved multi-color film is constructed or built up by printing from one color section of the negative upon the sensitized celluloid strip, and after developing and drying, re-coating and re-sensitizing the film, printing over the first printing from another section of the negative, and so again for the third. The single sensitized strip or film D is printed under the first section $a'$ of the negative A, then developed, washed, dyed, and dried as at $d'$ Fig. 3. This color may be red for example. The film or strip D is then sensitized a second time, printed from the second section $a^2$ of the negative A, developed, washed, dyed, and dried as at $d^2$ Fig. 3. This color may be green. The strip or film D is finally sensitized a third time, printed from the third section $a^3$ of the negative A developed, washed, dyed, and dried, as at $d^3$ Fig. 3. This color may be violet. The result is the complete color picture film. When the negative has the color section pictures in alternate sequence the strip or film D is first printed from the pictures representing one color and then from the pictures representing another color, superimposed on the first, the films being correspondingly moved between printings.

The respective sensitized gelatin coatings on the strip D may, if desired, be isolated by an intermediate layer of waterproof varnish as is well-known. And dyes may be used that will not mix with or contaminate the layers and dyes beneath, examples of which are known to dye experts. Finally the complete film may be protected by a layer of suitable waterproof varnish.

Any well known type of sensitive surface may be applied to the film or strip D which will yield prints $d'$ $d^2$ $d^3$ in different colors such as (A) Bichromated gelatin and mordanted dyes. (B) Bichromated gelatin and insoluble pigment. (C) Bichromated gelatin, glue, gum, albumen, or other colloid and soluble pigments such as water colors, or dyes if preferred. (D) Adhesive bichromated gelatin and pigments. (E) Silver images in gelatin or the like, afterward converted into colored images by treatment with any chemicals that will give the complementary or substantially complementary colors by conversion or toning; or by substitution, such as replacing the silver with a dye. These may be applied in any convenient or well known manner as more fully set out in my application Serial No. 733633, filed November 26, 1912, of which the present application is a division.

Accurate registration of the negatives is secured by perforating simultaneously the three sections $a'$, $a^2$, $a^3$, of the negative before printing, with perforations $a$, whether the negative A be slit into three or used in one triple strip. The film or strip D is also correspondingly perforated with perforations $d$ before printing. The perforations in both films are secured in coincident positions by series of pegs or teeth on the printing apparatus, which engage both together and prevent shifting or creeping.

What I claim as my invention and desire to protect by Letters Patent is:—

1. The method of producing films for motion or cinematograph pictures which consists in preparing simultaneously upon a negative a plurality of section color pictures, printing a film strip from one of such section picture negatives in its correct color, re-coating and re-sensitizing the film and again printing from another of these negatives in another color superimposed upon the first printed picture and so on to form a complete multi-color picture substantially as described.

2. The hereindescribed improvement in the art of producing films for motion or cinematograph pictures by the use of a negative with two or more section color pictures, which comprises printing a film strip from one of these color sections in its correct color, re-coating and re-sensitizing the film, and again printing from another of these color sections in another color, and so on to form a complete multi-color picture substantially as described.

3. A multi-color single width continuous film tape for moving or cinematograph pictures, comprising a transparent base having thereon a series of complete photographic pictures in natural colors, each picture embodying a plurality of color section photographs in different color layers accurately registered and superimposed, substantially as described.

4. A multi-color single width continuous film tape for moving or cinematograph pictures, comprising a transparent base having thereon a series of complete photographic pictures in natural colors, each picture comprising a plurality of section photographs in different colors and in different color layers in accurately registered and superimposed relation, substantially as described.

5. A complete multi-color single width film for cinematograph or motion pictures, comprising a transparent base having thereon a series of complete photographic pictures, each picture embodying superimposed color section photographs in different colors and in different layers, substantially as described.

6. A complete multi-color single width film for cinematograph or motion pictures, comprising a transparent base having thereon a plurality of superimposed layers of color section photographs in different colors, the color section photographs of the different layers being in register.

7. A multi-color single width continuous film tape for moving cinematograph pictures, comprising a transparent base, a plurality of superimposed layers of exposed emulsion thereon, each layer containing a picture in substantially complementary colors and the whole comprising a complete picture in natural colors, substantially as described.

In testimony whereof I have hereunto set my hand in presence of a subscribing witness.

JOHN EDWARD THORNTON.

Witness:
J. OWDEN O'BRIEN.